US008921742B2

(12) United States Patent
Zhang et al.

(10) Patent No.: US 8,921,742 B2
(45) Date of Patent: Dec. 30, 2014

(54) TOASTER COVER CONTROL DEVICE WITH FIREPROOFING FUNCTION AND APPLICATION METHOD THEREOF

(75) Inventors: Bei Zhang, Guangdong (CN); Huajin Chen, Guangdong (CN)

(73) Assignee: Crastal Technology (Shenzhen) Co., Ltd., Shenzhen, Guangdong (CN)

( * ) Notice: Subject to any disclaimer, the term of this patent is extended or adjusted under 35 U.S.C. 154(b) by 845 days.

(21) Appl. No.: 12/998,465

(22) PCT Filed: Nov. 17, 2009

(86) PCT No.: PCT/CN2009/074982
§ 371 (c)(1),
(2), (4) Date: Jun. 13, 2011

(87) PCT Pub. No.: WO2010/139156
PCT Pub. Date: Dec. 9, 2010

(65) Prior Publication Data
US 2011/0245977 A1 Oct. 6, 2011

(30) Foreign Application Priority Data
Jun. 2, 2009 (CN) .......................... 2009 1 0107806

(51) Int. Cl.
*H05B 1/02* (2006.01)
*A47J 37/08* (2006.01)

(52) U.S. Cl.
CPC ................ *A47J 37/08* (2013.01); *A47J 37/085* (2013.01); *A47J 37/0842* (2013.01)
USPC ........... 219/490; 219/481; 219/494; 219/497; 99/329 P; 99/391; 99/393; 426/466; 426/520

(58) Field of Classification Search
CPC ...... A37J 37/08; A37J 37/0842; A37J 37/085; A23L 1/01; A23L 1/025; H05B 1/0213; H05B 1/0261; H05B 3/026; H05B 1/0263; H05B 3/0076
USPC .......... 219/490, 481, 491, 494, 497; 99/329 P, 99/329 RT, 389, 391, 393; 426/466, 496, 426/520
See application file for complete search history.

(56) References Cited

U.S. PATENT DOCUMENTS

| | | | | |
|---|---|---|---|---|
| 3,416,430 A * | 12/1968 | Hauser | ........................ | 99/332 |
| 3,558,855 A * | 1/1971 | Stanek et al. | ................ | 219/385 |
| 5,458,052 A * | 10/1995 | McNair et al. | ................ | 99/385 |
| 7,105,778 B1 * | 9/2006 | DeLong et al. | ............... | 219/386 |
| 7,488,919 B2 * | 2/2009 | Gagas et al. | .................. | 219/400 |
| 2008/0083739 A1 * | 4/2008 | McLean | ....................... | 219/519 |

* cited by examiner

*Primary Examiner* — Mark Paschall
(74) *Attorney, Agent, or Firm* — Raymond Y. Chan; David and Raymond Patent Firm

(57) ABSTRACT

A toaster cover control device with fireproofing function comprises a cover sliding-frame or a cover opening-closing mechanism and a power switch (K), a cover switch (K1) and a control circuit that are provided in the toaster. The said control circuit is provided with a microprocessor. An output terminal of the control circuit is connected with a transistor (Q1). The said control circuit is connected with a sensor (S). The sensor detects the temperature of the toaster. The control circuit provides a control signal when the detected temperature exceeds the set temperature value, so that a circuit controlling cover action keeps the cover closed. The cover can be opened normally when the detected temperature is lower than the set temperature value. It is also provided with an application method of the said control device.

17 Claims, 5 Drawing Sheets

TOASTER COVER CONTROL DEVICE WITH FIREPROOFING FUNCTION AND APPLICATION METHOD THEREOF

BACKGROUND OF THE PRESENT INVENTION

1. Field of Invention

The present invention relates to a toaster cover control device with fireproofing function and application method thereof.

2. Description of Related Arts

At present, toaster device or oven is an appliance which is common in household and commercial use. Conventional toaster device may or may not include a cover. The operation of toaster device with cover usually involves an application method in which when the set time which is preset by a user is reached, the cover will be open and then the slice of bread on a toaster frame will be lifted by a support of the toaster device. This kind of toaster device will first open the cover even when the bread inside the toaster device is burning and is on fire, hence imposing a safety hazard in the operation of the toaster device. For example, when the size of the bread being put inside the toaster device is small, when the time that the bread stays inside the toaster device is prolonged for some reasons, or when the bread is stuck and could not be lifted, and therefore is kept toasting inside the toaster device, the bread inside the toaster device will probably burn to fire. If the cover is open automatically at this point, the user may get burnt or the things around the toaster device may burn and cause fire accident. Accordingly, this kind of toaster device has imposed a really great safety hazard.

SUMMARY OF THE PRESENT INVENTION

An object of the present invention is to provide a toaster cover control device with fireproofing function and application method thereof to solve the problem of using a toaster device for toasting a slice of bread in such a manner that the toaster cover is kept under a closed position when the temperature is too high or when the bread is on fire such that the fire inside the toaster device will not escape or spread outside to burning the user or causing fire accident.

Additional advantages and features of the invention will become apparent from the description which follows, and may be realized by means of the instrumentalities and combinations particular point out in the appended claims.

According to the present invention, the foregoing and other objects and advantages are attained by a control device of a cover of a toaster device with fireproof protection which comprises a sliding frame or an opening mechanism of the cover, a power switch provided in the toaster device, a cover switch and a control circuit, comprising: a microprocessor provided in the control circuit; a transistor connected to an output terminal of the control circuit; and a sensor connected to the control circuit.

According to the present invention, the sensor is provided at a preset position, wherein the preset position is at a side insulating plate adjacent to a heating groove of the toaster device, at a front or rear insulating plate, or proximal to a top portion of the heating groove.

According to the present invention, the sensor is a negative temperature coefficient thermistor, a thermocouple temperature sensor or an infrared temperature sensor.

According to the present invention, the control device is applied through an application method comprising the steps of:

(1) electrically connecting the toaster device, initiating the microprocessor, detecting the sensor through the microprocessor, and generating a warning signal if the sensor has an abnormal status as detected by the microprocessor;

(2) detecting a power supply of a heating element of the toaster device by the microprocessor, and starting a timing process if the heating element is powered while detecting and recording a temperature of the toaster device on a real time basis by the sensor;

(3) comparing the temperature which is detected by the sensor and a preset temperature, and generating a signal to the control circuit by the microprocessor when the microprocessor determines an overheat status in which the temperature is higher than the preset temperature;

(4) cutting off the power supply of the heating element of the toaster device through the control circuit;

(5) continuing to detect the temperature of the toaster device by the sensor and to compare the temperature which is detected by the sensor with the preset temperature, and generating a signal to the control circuit by the microprocessor if the temperature of the toaster device is lower than the preset temperature;

(6) opening the cover through a switching action of the control circuit; and (7) sending a signal to the control circuit through the microprocessor such that a sliding frame of the toaster device is lifted by the switching action of the control circuit.

According to the present invention, the toaster device further comprises a detection device for the sliding frame of the toaster device and a detection device for the cover.

According to the present invention, the detection device for the sliding frame of the toaster device and the detection device for the cover comprises a plurality of detection elements, which comprises a switch, a magnetic switch or an infrared emission unit; and a receiver diode, wherein the detection elements of the detection device for the sliding frame of the toaster device are provided adjacent to a channel of the sliding frame of the toaster device, wherein the detection elements of the detection device for the cover are provided adjacent to a channel of the sliding frame of the cover or to the cover.

According to the present invention, the control device is applied through an application method comprising the steps of:

(1) electrically connecting the toaster device, initiating the microprocessor, detecting the sensor through the microprocessor, and generating a warning signal if the sensor has an abnormal status as detected by the microprocessor;

(2) detecting a position of the sliding frame on a real-time basis through the detection device for the sliding frame to determine if the position of the sliding frame is at the bottom position;

(3) detecting a position of the cover by the detection device for the cover to determine if the cover is at the closed position when the position of the sliding frame is determined to be at the bottom position by the microprocessor;

(4) sending a signal to the control circuit if a detected data of the microprocessor through the detection device for the cover determines the cover is at the closed position;

(5) providing the power supply of the heating element of the toaster device through a switching action of the control circuit;

(6) detecting the power supply of the heating element of the toaster device by the microprocessor, and starting a timing process if the heating element is powered while detecting and recording a temperature of the toaster device on a real time basis by the sensor;

(7) comparing the temperature which is detected by the sensor and a preset temperature, and generating a signal to the control circuit by the microprocessor when the microprocessor determines an overheat status in which the temperature is higher than the preset temperature;

(8) cutting off the power supply of the heating element of the toaster device through the control circuit;

(9) comparing the temperature which is detected by the sensor with the preset temperature through the microprocessor after the preset time is reached and generating a signal to the control circuit by the microprocessor if the temperature of the toaster device is lower than the preset temperature;

(10) opening the cover through the switching action of the control circuit; and

(11) sending a signal to the control circuit through the microprocessor after a delayed time period such that a sliding frame of the toaster device is lifted by the switching action of the control circuit.

According to the present invention, the control device is applied through an application method comprising the steps of:

(1) electrically connecting the toaster device, initiating the microprocessor, and detecting an operation status the sensor through the microprocessor;

(2) detecting a position of the sliding frame of the toaster device and a position of the cover on a real-time basis through the detection device for the sliding frame and the detection device for the cover respectively;

(3) if the position of the sliding frame is determined to be at the bottom position by the microprocessor, determining whether the cover is at the closed position by the microprocessor;

(4) if the position of the cover is determined to be at the closed position by the microprocessor, detecting the power supply of the heating element of the toaster device by the microprocessor, and starting a timing process if the heating element is powered while detecting and recording a temperature of the toaster device on a real time basis by the sensor;

(5) comparing the temperature which is detected by the sensor with the preset temperature through the microprocessor after the preset time is reached and generating a signal to the control circuit by the microprocessor if the temperature of the toaster device is lower than the preset temperature;

(6) opening the cover through the switching action of the control circuit; and (7) sending a signal to the control circuit through the microprocessor after a delayed time period such that a sliding frame of the toaster device is lifted by the switching action of the control circuit.

According to the present invention, the control device further comprises a time control circuit for protecting the cover connected in parallel with the control circuit in the toaster device, a cover switch in the toaster device, and a (second) transistor connected to an output terminal of the time control circuit, wherein the control circuit is defined as a main control circuit.

According to the present invention, the time control circuit has an anode collected to an anode of a power source through the cover switch, wherein the output terminal of the time control circuit is connected to a base of the second transistor, wherein the second transistor has a collector connected to an emitter of a (third) transistor which is connected in parallel, wherein the third transistor has a base connected to an output terminal of the main control circuit for controlling the sliding frame of the cover through a diode, wherein the main control circuit further defines a control element, which is a microprocessor or a timing control device formed by connected a chip unit for timing control and a control circuit.

The present invention, when compared to conventional toaster device, is advantageous in that a sensor is provided in a body of the toaster device or in the frame of the toaster device such that a temperature of the toaster device is detected to determine whether the temperature as detected is within the range of normal preset temperature. If the temperature as detected is higher than the preset temperature, the control circuit will send a signal to control the cover through the control circuit such that the cover is maintained at a closed position. Only if the temperature as detected by the sensor is lowered to the level which is lower than the preset temperature, the cover will then be arranged to move to the open position. That is to say, if the bread object inside the toaster device is burn to fire inside the toaster device, the cover will be closed until the fire is extinguished.

Still further objects and advantages will become apparent from a consideration of the ensuing description and drawings.

These and other objectives, features, and advantages of the present invention will become apparent from the following detailed description, the accompanying drawings, and the appended claims.

DETAILED DESCRIPTION OF THE PREFERRED EMBODIMENT

Figure 1:
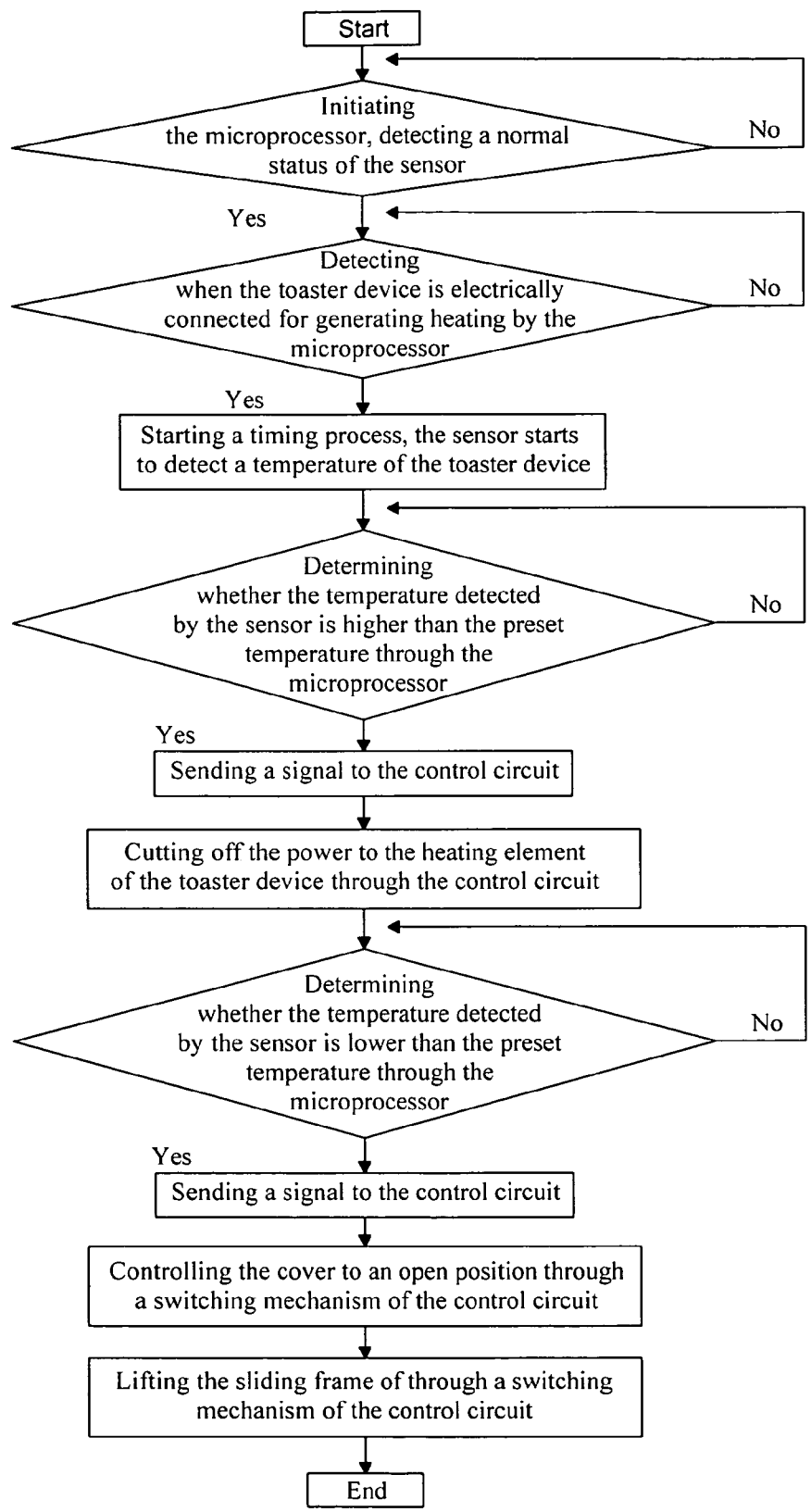
FIG. 1 is a schematic illustration of a first exemplary embodiment according to a preferred embodiment of the present invention.

The present invention is further described in details through the following detailed description and the accompanying drawings, The use of toaster device without cover in the current market to make a toast has the disadvantages of low efficiency, time consuming, and uneven toasting effect. More importantly, the opening of the toaster device without cover is on the top of the toaster device which is not hygiene. In addition, the electric parts are exposed, imposing high risk of short circuit. When an accident occurs, such as when the size of the beard being put inside the toaster device is small, when the time that the bread stays inside the toaster device is prolonged for some unexpected reasons, or when the bread is stuck and could not be lifted causing the bread to keep toasting inside the toaster device, the bread inside the toaster device will burn to fire and the user may get burnt. In case no one is presence, the fire may spread to burn things around and lead to fire accident, thus imposing a great risk of safety hazard. On the other hand, the toaster oven with cover has been developed recently which has the advantages of high efficiency, time saving, and even toasting effect. In particular, during the toasting process, the electric parts which includes the heating element are enclosed inside the toaster oven or device and the user cannot have contact with the electrically connected heating element. Accordingly, the toaster device with cover is a relatively safe product. However, similar to the toaster device without cover, this kind of toaster device with cover has one great problem, which is when an accident is happened in which the bread is burnt to fire, the cover will first be open and then the slice of bread on a toaster frame will be lifted by a support of the toaster device when the set time which is preset by a user is reached, thus the bread which is on fire will be exposed, causing burn injury to the user or fire accident. Accordingly, in order to solve the above problem, the present invention provide a control device to control the operation of a cover of a toaster device as follows:

Referring to FIGS. 1 to 5 of the drawings, which illustrate the preferred embodiment of the present invention, the present invention is a control arrangement (control device) for a cover of a toaster device which includes a power switch K, a cover switch K1 and a control circuit which are provided inside the toaster device. The control circuit comprises a microprocessor and a transistor Q1, and has an output terminal connected to the transistor Q1. The control circuit further include a sensor S. The present invention provides an application method comprising the steps of (1) initiating the microprocessor through electrically powering the toaster device, and generating a warning signal if the sensor has an abnormal status which is detected through the microprocessor;

(2) supporting a bread object through a support which is provided on a sliding frame when the bread object is put inside a heating groove of the toaster device, wherein a user press a handle of the sliding frame downwardly, the bread object is controlled to move downwardly in such a manner that when the bread object reach a bottom portion of the sliding frame, a pressing unit of the sliding frame then pushes a rod unit of the power switch K downwardly such that the power switch K is turned on to electrically connecting the heating element to the power source, and the sliding frame is sliding downwardly through moving a handle of a sliding frame of the cover by the user until a suspending element of the sliding frame of the cover is lock into position with a conductive hook of a coil of the sliding frame of the cover such that the cover is maintained into a closing position, wherein the microprocessor detects the connectivity between the heating element and the power source and starts timing if the heating element is connected to the power source, wherein the sensor S then starts detecting and recording a toasting temperature of the toaster device on a real time basis;

(3) comparing the toasting temperature detected by the sensor S and the preset temperature, and generating a signal to the control circuit by the microprocessor when the microprocessor detects an overheat status in which the toasting temperature is higher than the preset temperature;

(4) cutting of the power to the heating element of the toaster device through the control circuit;

(5) continue detecting the temperature of the toaster device by the sensor S and generating a signal to the control circuit by the microprocessor when the microprocessor compares the temperature of the toaster device detected by the sensor S with the preset temperature and determines that the temperature of the toaster device is lower than the preset temperature;

(6) opening the cover through switching action of the control circuit;

(7) sending a signal to the control circuit through the microprocessor after a preset delay time period (the preset delay time period is usually equal to or greater than 0.5 second or is usually preset by a user, thereby the cover is first open and then the sliding frame is lifted to avoid the bread object being blocked by the cover when being lifted through the sliding frame) such that the sliding frame is lifted by the switching action of the control circuit.

The sensor S can be a negative temperature coefficient (NTC) thermistor, a thermocouple temperature sensor or an infrared temperature sensor. In general, the sensor S is provided at a position at which the temperature variation is great, such as the position of a side insulating plate adjacent to the heating groove of the toaster device or a front or rear insulating plate, or around a top portion of the heating groove.

When the sensor S is a negative temperature coefficient (NTC) thermistor, the resistance is inversely proportional to the temperature. The voltage of the NTC thermistor reflects the temperature at the heating groove which is processed through module conversion by the microprocessor to obtain a value which represents the temperature of the heating groove, wherein the value of the temperature of the heating groove is negatively related to the temperature of the heating groove. The switching action for connecting or disconnecting the power of the heating groove is controlled through a silicon controlled rectifier SCR or a relay device, or the control circuit is arranged to unlocking the suspending element from the metal connector through removing the magnetic force of the metal connector by disconnecting the electricity to the coil of the sliding frame such that the sliding frame is lifted while the pressing unit of the sliding frame is detached from the rod unit of the power switch K and the power switch K is disconnected, thereby the heating element is electrically disconnected.

When the sensor S is a thermocouple temperature sensor, wherein the thermocouple temperature sensor only consists of two alternate status, an open status and a close status, and is connected in series in the circuit, that is to say when the temperature of the toaster device is higher than a preset value, the thermocouple is separated and so the power of the heating element is disconnected, at this point, a tap point of the heating circuit is selected for a voltage test point, the voltage at the voltage test point is detected through the microprocessor to determine if the heating circuit is electrically connected so as to determine whether the toaster device is overheat. If the circuit is not electrically connected, the toaster device is defined as overheat. If the circuit is electrically connected, the toaster device is defined as not overheat. These data is collected by the microprocessor for the subsequent steps in controlling the temperature of the toaster device.

When the sensor S is an infrared temperature sensor, the output of the infrared sensor is usually a current or a voltage. The microprocessor can be connected in series or in parallel with a resistance at the output terminal to obtain the variation of output voltage to determine the temperature change, that this temperature change is reflective to the heating groove of the toaster device and is quantified through data conversion by the microprocessor to represent a temperature of the heating groove. The temperature of the heating groove is compared with the preset temperature. If an overheat status is determined by the microprocessor, a signal is sent to the control circuit. The switching action which cuts off the power supply of the heating groove is realized through a controlled rectifier, a silicon controlled rectifier SCR, a relay device, or the control circuit is arranged to unlocking the suspending element from the metal connector through removing the magnetic force of the metal connector by disconnecting the electricity to the coil of the sliding frame such that the sliding frame is lifted while the pressing unit of the sliding frame is detached from the rod unit of the power switch K and the power switch K is disconnected, thereby the heating element is electrically disconnected.

A control method of switching action of the control circuit to open the cover includes the steps of: sending a signal to the control circuit through a microprocessor, wherein the control circuit has an output terminal connected to a transistor, such as a signal for the control circuit in which a voltage of the base of the NPN transistor is converted from a high to low level such that the transistor is stopped and the coil for the metal connector which is connected in series with the NPN transistor is disconnected, thereby an attractive force with the metal connector is lost, while the suspending element of the sliding frame of the cover is detached from the hook of the metal connector and is moved upward through the spring tension to open the cover.

A control method of switching action of the control circuit to lift the sliding frame of the toaster device includes similar step as described in the preceding paragraph.

A control method of the cover and the sliding frame in motor driven toaster device generally involves the opening and closing action of the cover in relation to the action of the sliding frame. When the sliding frame moves downwardly to reach the bottom portion, the cover also starts to move to the close position while the sliding frame is moving downwardly to reach the bottom portion, which is a simple but reliable structure. Of course, the operation of the cover and the sliding frame can also be controlled independently. However, at least two motor units are required which is relatively costly for controlling the opening and closing actions of the cover and the lifting action of the sliding frame. Alternately, the control method of the cover comprises a single motor to control the opening and closing actions of the cover and the lifting action of the sliding frame through a switching mechanism connecting to and switching between the cover and the sliding frame, wherein when movement of the cover is required, the switching mechanism is arranged to connect to the sliding frame of the toaster device, while when the movement of the cover is not required, the switching mechanism is arranged to disconnect to the sliding frame.

In general, the microprocessor determines whether the toaster device is connected to the power supply for heating through a current detection method in which a current flowing status of the heating element of the heating groove of the toaster device. In particular, the method includes a step of obtaining a voltage of a section of the heating element, that is, adding a tapping point on the heating element of the mica heating element and detecting if there is any voltage. Accordingly, the presence of any detected voltage is an indication that current is flowing through and hence the heating groove of the toaster device is connected to the power supply. Alternately, the step of detecting a voltage between the two terminals of the coil of the heating element of the heating groove which is controlled by the relay device can be employed. The presence of any detected voltage is an indication that current is flowing through and hence the heating groove of the toaster device is connected to the power supply.

Figure 5:
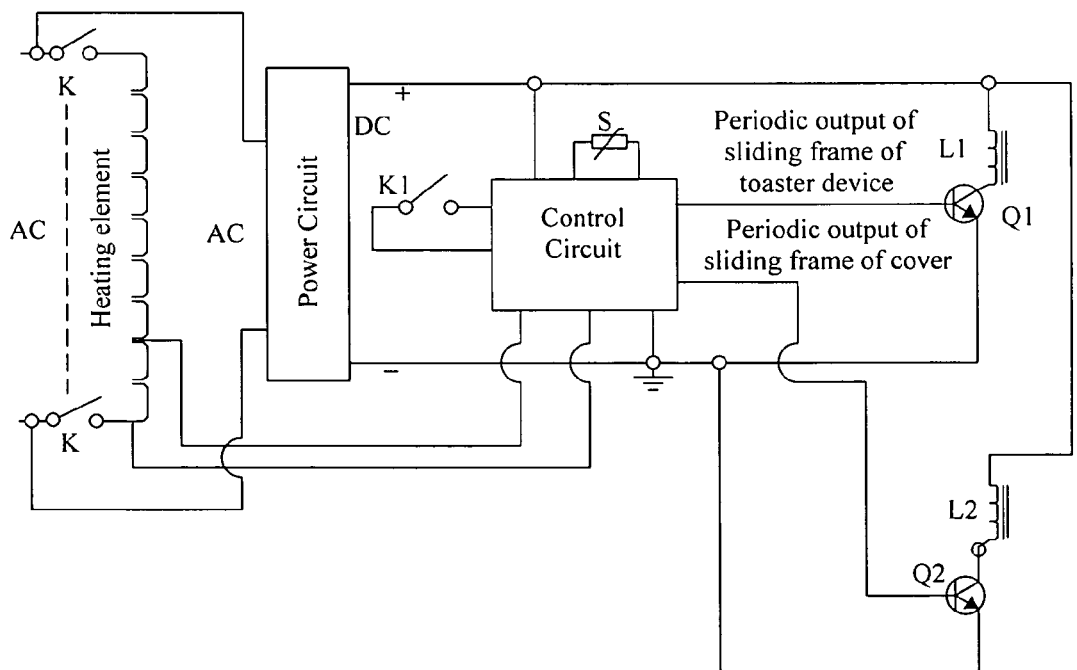
FIG. 5 is a circuit diagram illustration showing the control of heating unit through a power switch for the first to third exemplary embodiments according to the above preferred embodiment of the present invention.
Figure 6:
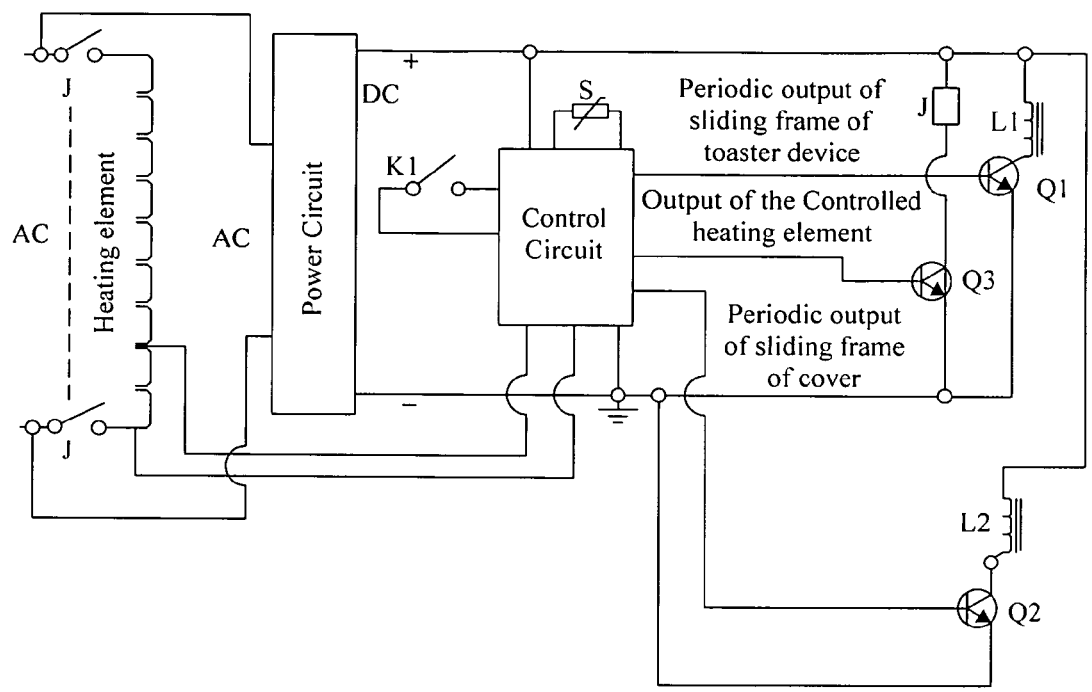
FIG. 6 is a circuit diagram illustration showing the control of heating unit through a relay switch for the first to third exemplary embodiments according to the above preferred embodiment of the present invention.

The control circuit comprises a microprocessor serving as the main control circuit element, which has an output terminal connected to a transistor. The switching mechanism for connecting or disconnecting the power supply to the heating groove of the toaster device is controlled through a SCR or a relay device, or through a simplified configuration which is customized according to the operation of the toaster device. In particular, the toaster device with cover usually includes a handle and a pressing unit in the sliding frame of the toaster device, when a user press down the handle of the sliding frame of the toaster device, the sliding frame is guided to slide downward, while when the sliding frame of the toaster device is close to the bottom of the heating groove, the pressing unit of the sliding frame of the toaster device is biased against a rod unit of the power switch K which is connected to the heating element of the heating groove of the toaster device such that the power switch K is turned onto a closed position and therefore the heating element of the heating groove of the toaster device is connected to the power supply. At the same time, the power supply of the heating element is also the power supply for the PCB of the control circuit or some driving parts of the PCB, such as the power supply for the transistor which drives the coil of the metal connector of the sliding frame. Accordingly, the driving parts of the PCB is connected to the power supply, electrically connecting the coil of the metal connector of the sliding frame and generate an attractive force to the metal connector such that the conductive hook of the sliding frame is locked into position, thereby the sliding frame is kept into position at the bottom of the heating groove of the toaster device, while a continuous power supply is provided to the heating groove. On the other hand, if the power supply is disconnected from the heating element of the heating groove of the toaster device, the control circuit becomes electrically disconnected with the coil such that the metal connector is released in the absence of magnetic force of the coil, thereby the conductive hook of the sliding frame is unlocked from metal connector. Through the spring tension of the sliding frame of the toaster device, the sliding frame is lifted and the pressing unit of the sliding frame of the toaster device is detached from the rod unit of the power switch K such that the power switch K is turned off to an open status. As shown in FIGS. 5 and 6, alternately, the control circuit can also utilize a power circuit (such as transformer, switch, or RC circuit etc. after rectifying, filtering and regulating process) for providing power supply to the control circuit. The heating element is connected to the output terminal of the power switch K or to the relay unit J, wherein when the power switch K is closed or when the relay unit J is closed, the heating element starts a heating process. The type of power supply allows the control circuit to operate with the power supply from the power circuit irregardless of the electrical connectivity between the heating element and the power supply.

Figure 2:
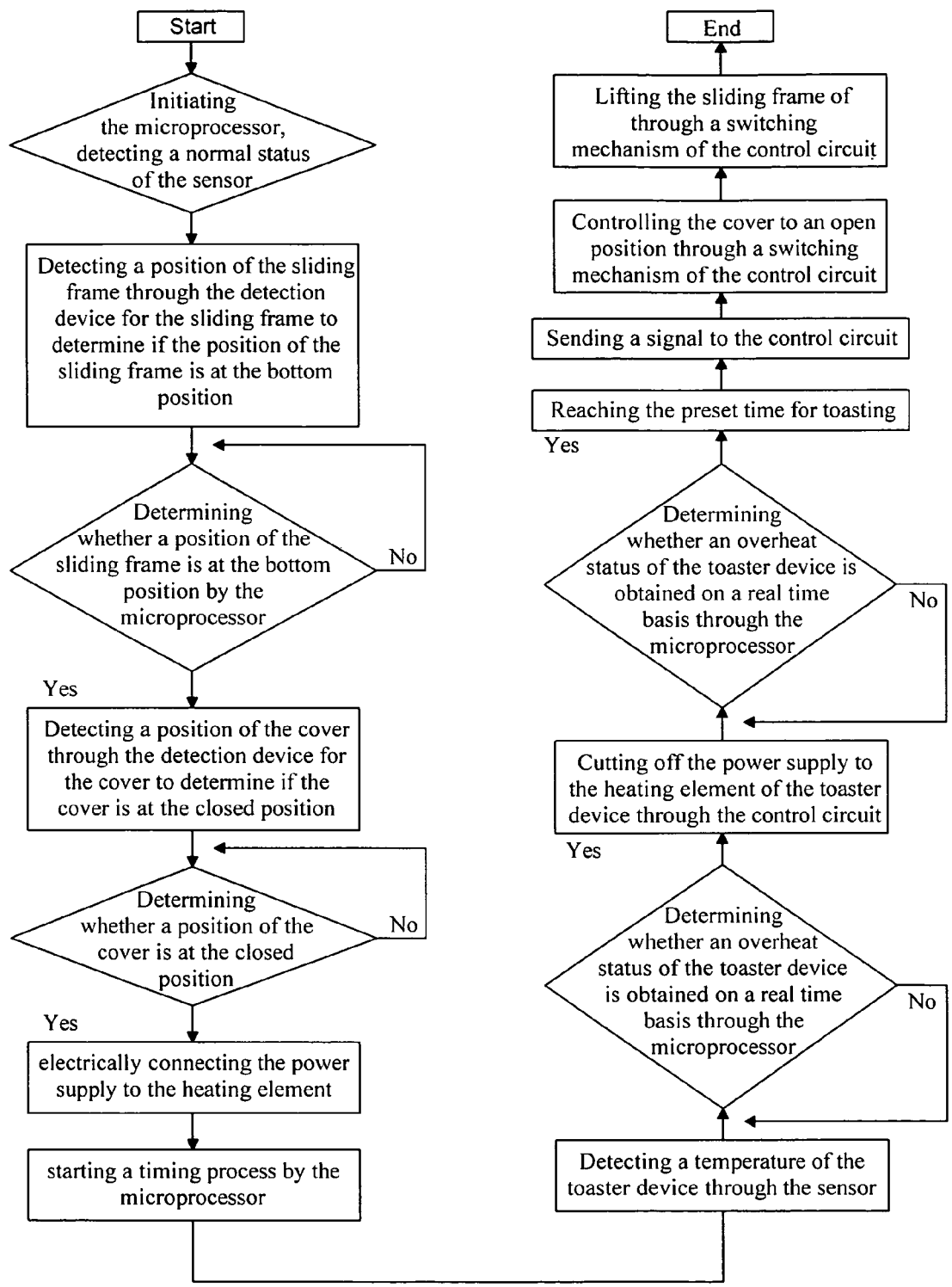
FIG. 2 is a schematic illustration of a second exemplary embodiment according to the above preferred embodiment of the present invention.

Referring to FIG. 2 of the drawings, which illustrates the second exemplary embodiment according to the above preferred embodiment of the present invention, the toaster device further comprises a detection device for the sliding frame and a detection device for the cover which are applied through an application method comprising the steps of: (1) electrically connecting the toaster device, initiating the microprocessor, detecting the sensor through the microprocessor, and generating a warning signal if the sensor has an abnormal status as detected by the microprocessor; (2) detecting a position of the sliding frame on a real-time basis, wherein after a user places a bread object inside the heating groove and presses down the handle of the sliding frame, the bread object supported on the support of the sliding frame is moved downward to the bottom portion of the heating groove, then the detection device for the sliding frame will then detect that the bread object is positioned at the bottom portion of the toaster device; (3) detecting a position of the cover by the detection device for the cover to determine if the cover is at the closed position when the position of the sliding frame is determined to be at the bottom position by the microprocessor; (4) sending a signal to the control circuit if a detected data of the microprocessor through the detection device for the cover determines the cover is at the closed position; (5) providing the power supply of the heating element of the toaster device through a switching action of the control circuit; (6) detecting the power supply of the heating element of the toaster device by the microprocessor, and starting a timing process if the heating element is powered while detecting and recording a temperature of the toaster device on a real time basis by the sensor; (7) comparing the temperature which is detected by the sensor and a preset temperature, and generating a signal to the control circuit by the microprocessor when the microprocessor determines an overheat status in which the temperature is higher than the preset temperature; (8) cutting off the power supply of the heating element of the toaster device through the control circuit; (9) comparing the temperature which is detected by the sensor with the preset temperature through the microprocessor after the preset time is reached and generating a signal to the control circuit by the microprocessor if the temperature of the toaster device is lower than the preset temperature; (10) opening the cover through the switching action of the control circuit; and (11) sending a signal to the control circuit through the microprocessor after a delayed time period such that a sliding frame of the toaster device is lifted by the switching action of the control circuit.

Figure 3:
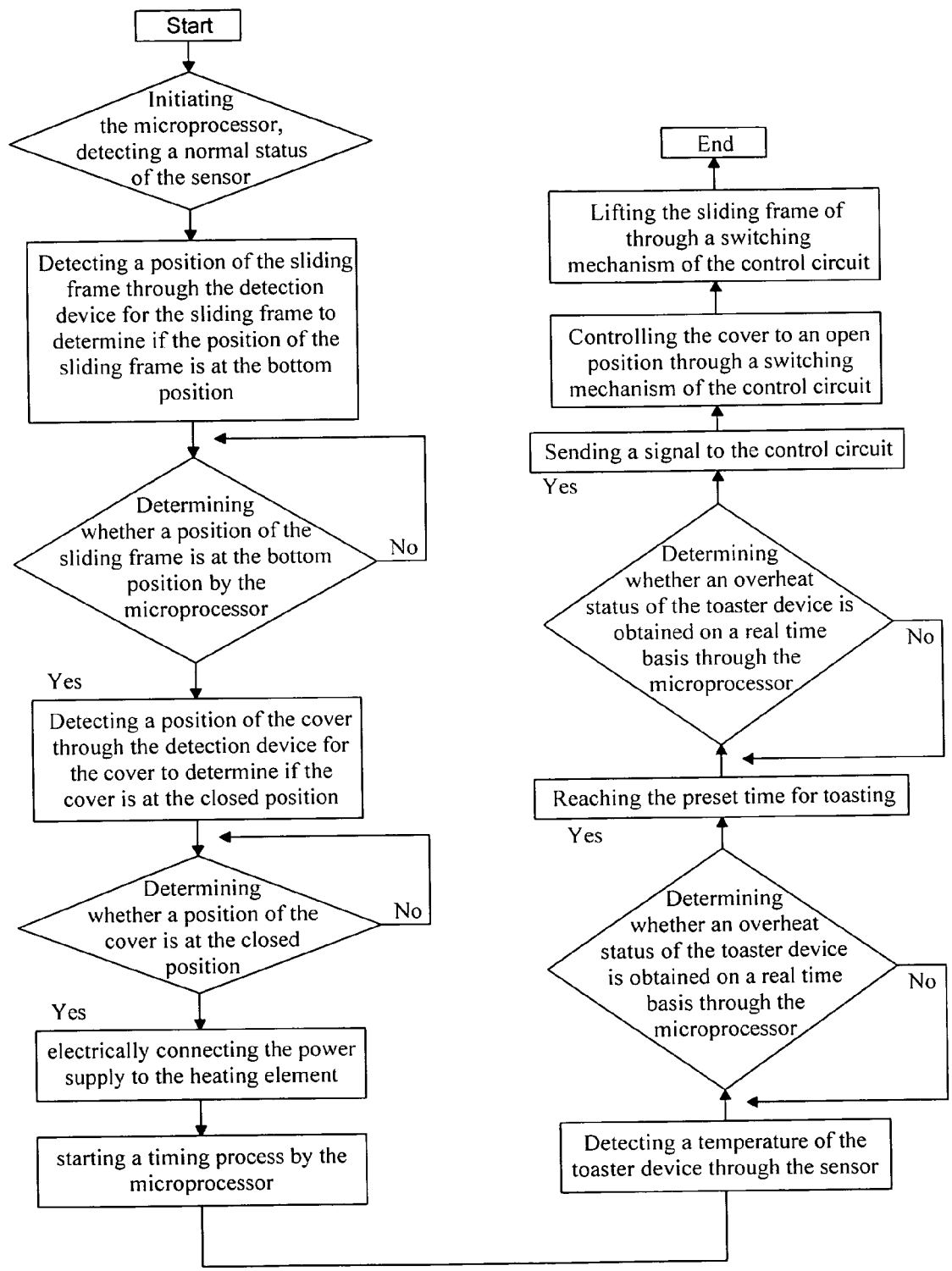
FIG. 3 is a schematic illustration of a third exemplary embodiment according to the above preferred embodiment of the present invention.

Referring to FIG. 3 of the drawings, which illustrates the third exemplary embodiment according to the above preferred embodiment of the present invention, the toaster device further comprises a detection device for the sliding frame and a detection device for the cover which are applied through an application method comprising the steps of: (1) electrically connecting the toaster device, initiating the microprocessor, and detecting an operation status the sensor through the microprocessor; (2) detecting a position of the sliding frame of the toaster device and a position of the cover on a real-time basis through the detection device for the sliding frame and the detection device for the cover respectively; (3) if the position of the sliding frame is determined to be at the bottom position by the microprocessor, determining whether the cover is at the closed position by the microprocessor; (4) if the position of the cover is determined to be at the closed position by the microprocessor, detecting the power supply of the heating element of the toaster device by the microprocessor, and starting a timing process if the heating element is powered while detecting and recording a temperature of the toaster device on a real time basis by the sensor; (5) comparing the temperature which is detected by the sensor with the preset temperature through the microprocessor after the preset time is reached and generating a signal to the control circuit by the microprocessor if the temperature of the toaster device is lower than the preset temperature; (6) opening the cover through the switching action of the control circuit; and (7) sending a signal to the control circuit through the microprocessor after a delayed time period such that a sliding frame of the toaster device is lifted by the switching action of the control circuit.

The detection device for the sliding frame of the toaster device and the detection device for the cover includes detection elements such as a switch, a magnetic switch, and a receiver diode and an infrared emission unit. The detection elements of the detection device for the sliding frame of the toaster device are provided adjacent to a channel of the sliding frame of the toaster device, which is usually a sensor contact point provided in the sliding frame. When the sliding frame is moved downwardly, the sensor contact point is in contact with the on/off switch of the detection device such that the switch is turned to an on or off position. Accordingly, a signal is capable of being generated to the microprocessor when the sliding frame reaches the bottom portion of the heating groove, such that the subsequent step can be determined and performed. Alternately, a magnetic object is provided on the sliding frame. When the sliding frame is moved downwardly, the magnetic object induces the magnetic switch to switch between an on or off position. Accordingly, a signal is capable of being generated to the microprocessor when the sliding frame reaches the bottom portion of the heating groove, such that the subsequent step can be determined and performed. Alternately, a blocking object is provided on the sliding frame. When the sliding frame is moved downwardly, the blocking object blocks the emitted light of the infrared emission unit. Accordingly, a signal is capable of being generated to the microprocessor when the sliding frame reaches the bottom portion of the heating groove, such that the subsequent step can be determined and performed. The detection elements of the detection device for the cover are provided adjacent to a channel of the sliding frame of the cover or to the cover. For the closing movement of the cover through the detection elements of the detection device for the cover, the sliding frame of the cover has similar operation as the sliding frame of the toaster device utilizing detection of the detection device of the sliding frame of the toaster device in which a signal is generated through a sensor contact point on the sliding frame for switching on or off the switch, a magnetic object to turn on or off the magnetic switch, or a blocking object on the sliding frame to block the emitted light from the infrared emission unit, then the microprocessor obtains the signal that the cover is under the close position and starts processing and computing so as to continue the next step of the control process.

Figure 4:
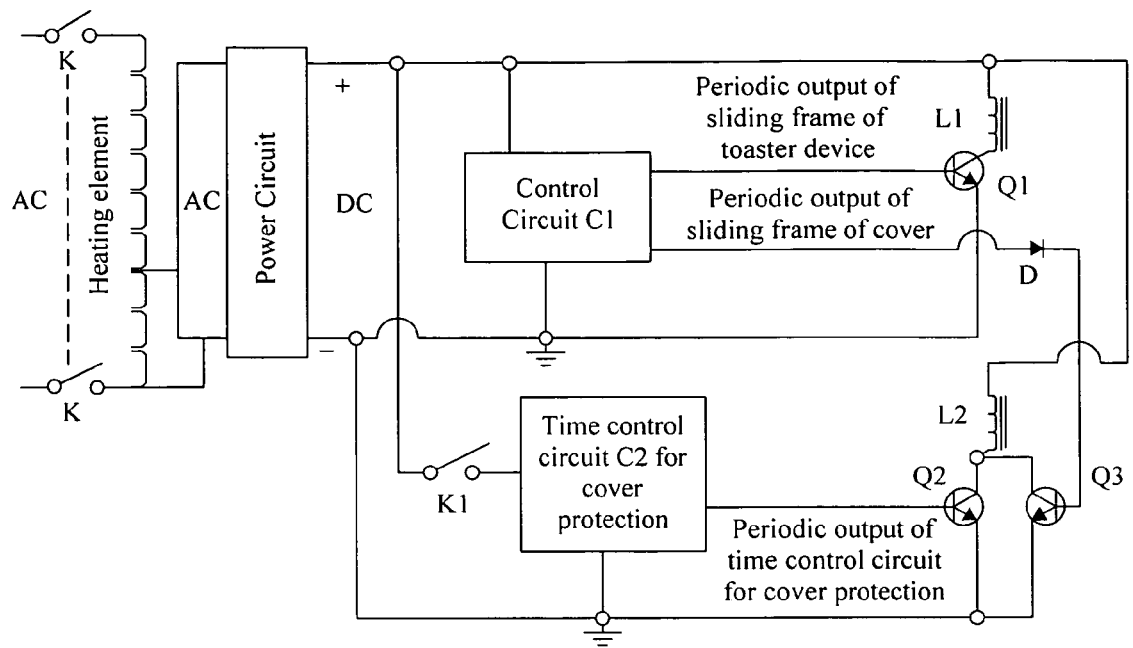
FIG. 4 is a circuit diagram of a fourth exemplary embodiment according to the above preferred embodiment of the present invention.

Referring to FIG. 4 of the drawings which is a fourth exemplary embodiment of the preferred embodiment of the present invention, the toaster device further includes a time control circuit (C2) for protecting the cover, a cover switch (K1), and a (second) transistor (Q2) for protecting the time control circuit. The control circuit is defined as the main control circuit (C1), the time control circuit (C2) has an anode connected to an anode of a power source through the cover switch (K1), the output terminal of the time control circuit is connected to a base of the second transistor (Q2), a collector of the second transistor (Q2) is connected to a collector of a (third) transistor (Q3) and a terminal of the cover coil (L2) while the second transistor (Q2) and the third transistor (Q3) are connected in parallel, an emitter of the second transistor (Q2) and an emitter of the third transistor (Q3) are earthed, a base of the third transistor (Q3) is connected to an output terminal of the main control circuit (C1) for controlling the sliding frame of the cover through a diode (D).

Because the pressing unit is provided on the sliding frame of the toaster device, when starting the operation of the toaster device, a user presses down the handle of the sliding frame of the toaster device such that the sliding frame is moved downward. When the sliding frame is moved to a position which is close to the bottom of the heating groove, the pressing unit of the sliding frame presses toward the rod unit of the power switch K of the heating element of the heating groove of the toaster device such that the power switch K is closed and the power circuit of the heating element of the heating groove is electrically connected, while this power circuit is also responsible for power supply to the corresponding PCB of the control circuit or to some driving elements of the PCB, such as the transistor Q1 which drives the coil L1 of the metal connector of the toaster device. According, the driving circuit of the PCB is electrically connected to the power supply and the coil L1 of the metal connector of the sliding frame is electrically connected, thereby an attractive force is generated to magnetically attract the metal connector in such a manner that the conductive hook of the sliding frame of the toaster device is locked into position so as to maintain the sliding frame to position at the bottom portion of the heating groove while maintaining the electric connection between the power supply and the heating groove. At this point, if the user needs to use the cover for toasting, the user presses down the handle of the sliding frame of the cover such that the sliding frame of the cover is moved downward. When the sliding frame of the cover is moved to a position which is close to the bottom, the power switch K1 of the cover is closed. Then, the cover timing control circuit C2 starts a timing process while the main control circuit C1 of the toaster device also starts a timing process. When the toasting time reached the preset time, an output terminal of the main control circuit C1 for controlling the timing of the cover will have a low power level such that the transistor Q3 of the coil L2 of the sliding frame of the cover is disconnected, the coil L2 of the cover is not electrically powered and hence the magnetic force is lost, thereby the cover is open. After a period of delay time, the output terminal of the coil L1 of the main control circuit C1 of the sliding frame of the toaster device transmits a low level power of the transistor Q1 to the control circuit such that the coil L1 of the sliding frame of the toaster device is electrically disconnected and hence the magnetic attraction is lost, therefore, the sliding frame is lifted by the spring action at the time the suspending element is detached from metal connector. At this particular moment, if there is any incident such as a circuit problem, or an abnormal output from the main control circuit, which leads to an overtime toasting period, the coil L1 of the sliding frame of the toaster device is electrically connected and is magnetically attracted, thereby the sliding frame of the toaster device is kept at the bottom portion of the heating groove and the bread object is kept heating in the heating groove. When the toasting time of the toaster device reaches the preset time of the time control circuit C2 for protecting the cover, the time control circuit C2 for protecting the cover will transmit a high power level, the coil of the sliding frame of the cover which is controlled by the time control circuit C2 for protecting the cover will induce the transistor Q2 to become electrically connected such that the coil of the sliding frame of the cover is magnetically attractive to maintain the cover at the close position. At this point, even if the main control circuit C1 transmits a low power level, the coil L2 of the sliding frame of the cover will not be electrically disconnected. Accordingly, notwithstanding that the bread object is maintained at the bottom portion of the heating groove of the sliding frame of the toaster device and the bread object is being heated continuously or even burn to fire, accident arising from the burning bread object is prevented because the time control circuit C2 for protecting the cover is capable of maintaining the cover at the closed position.

Referring to FIG. 5 of the drawings, a circuit diagram of the power circuit for power supply for the control of heating unit for the first to third exemplary embodiments according to the above preferred embodiment of the present invention is illustrated. This circuit diagram utilizes a power circuit (such as transformer, switch, RC or step-down circuitry, etc., after rectifying, filtering and regulating processes) as control circuit for power supply. The heating element is connected to the output terminal of the power switch K, wherein when the power switch K is closed, a heating process of the heating element will start. This type of power supply allows the control circuit to operate with the power supply from the power circuit irregardless of the electrical connectivity between the heating element and the power supply.

Referring to FIG. 6 of the drawings, a circuit diagram of the relay unit for power supply for the control of heating unit for the first to third exemplary embodiments according to the above preferred embodiment of the present invention is illustrated. This circuit diagram utilizes a power circuit (such as transformer, switch, RC or step-down circuitry, etc., after rectifying, filtering and regulating processes) as control circuit for power supply. The heating element is connected to the relay unit J through the connecting terminals of the relay unit J, wherein when the output terminal of the control circuit for controlling the heating element has a high power level, the relay unit J is closed and a heating process of the heating element will start, wherein when the output terminal of the control circuit for controlling the heating element has a low power level, the relay unit J is open and the heating process of the heating element will stop. This type of power supply allows the control circuit to operate with the power supply from the power circuit irregardless of the electrical connectivity between the heating element and the power supply.

In the above exemplary embodiments, the main control circuit (C1) is a microprocessor serving as a control element. Alternate control element includes a timing control device formed by connected a chip unit for timing control and a control circuit.

One skilled in the art will understand that the embodiment of the present invention as shown in the drawings and described above is exemplary only and not intended to be limiting.

It will thus be seen that the objects of the present invention have been fully and effectively accomplished. It embodiments have been shown and described for the purposes of illustrating the functional and structural principles of the present invention and is subject to change without departure from such principles. Therefore, this invention includes all modifications encompassed within the spirit and scope of the following claims.

What is claimed is:
1. A toaster device, comprising:
a body having at least a heating groove for fitting a bread therein, and comprising a heating element in said heating groove for generating heat at a predetermined toasting temperature, and a sliding frame movably supported at said heating groove for guiding said bread in said heating groove to be toasted and for lifting up said bread out from said heating groove after said bread is toasted;
a cover coupled on said body to selectively cover said heating groove, wherein said cover is operated between a closed position and an opened position via an opening mechanism; and
a control device which comprises a control circuit operatively controlling said sliding frame, a power switch operatively linked to said heating element, a cover switch operatively linked to said opening mechanism, and a sensor operatively linked to said control circuit for detecting said toasting temperature, wherein when said sensor detects an overheat status in which said toasting temperature is higher than a preset temperature, said power switch is activated to out off a power of said heating element, wherein after said toasting temperature is dropped below said preset temperature, said cover switch is activated to move said cover from said closed position to said opened position, and said sliding frame is actuated for lifting up said bread from said heating groove.

2. The toaster device, as recited in claim 1, wherein said sensor is located within said heating groove and is selected from the group consisting of a negative temperature coefficient thermistor, a thermocouple temperature sensor, and an infrared temperature sensor.

3. The toaster device, as recited in claim 1, wherein said control device further comprises a first detection device operatively linked to said control circuit for detecting said sliding frame at its lowest position within said heating groove, and a second detection device operatively linked to said control circuit for detecting said cover at said closed position.

4. The toaster device, as recited in claim 2, wherein said control device further comprises a first detection device operatively linked to said control circuit for detecting said sliding frame at its lowest position within said heating groove, and a second detection device operatively linked to said control circuit for detecting said cover at said closed position.

5. The toaster device, as recited in claim 1, wherein said control circuit comprises a main control circuit operatively controlling said sliding frame and said opening mechanism in a time delaying manner, wherein when said main control circuit detects a toasting time reaching a preset time, said opening mechanism is initially activated to move said cover to said opened position from said closed position, and said sliding frame is then time-delayed to be activated to lift up after said cover is moved in said opened position.

6. The toaster device, as recited in claim 4, wherein said control circuit comprises a main control circuit operatively controlling said sliding frame and said opening mechanism in a time delaying manner, wherein when said main control circuit detects a toasting time reaching a preset time, said opening mechanism is initially activated to move said cover to said opened position from said closed position, and said sliding frame is then time-delayed to be activated to lift up after said cover is moved in said opened position.

7. The toaster device, as recited in claim 5, wherein said control circuit further comprises a time control circuit operatively linked to said main control circuit, wherein in case of an abnormal operation of said main control circuit that said toasting time is over said preset time, said time control circuit is activated to maintain said cover in said closed position via said opening mechanism and to maintain said sliding frame at its lowest position.

8. The toaster device, as recited in claim 6, wherein said control circuit further comprises a time control circuit operatively linked to said main control circuit, wherein in case of an abnormal operation of said main control circuit that said toasting time is over said preset time, said time control circuit is activated to maintain said cover in said closed position via said opening mechanism and to maintain said sliding frame at its lowest position.

9. A controlling method of toasting a bread by a toaster device, comprising the steps of:
(a) downwardly sliding a sliding frame in a heating groove of a body to place said bread therein and moving a cover from an opened position to a closed position to cover said heating groove;
(b) activating a heating element for generating heat at a predetermined toasting temperature within said heating groove;
(c) detecting said toasting temperature by a sensor in response to a preset temperature, wherein an overheat status is determined when said toasting temperature is higher than said preset temperature;
(d) in response to said overheat status, cutting off a power of said heating element;
(e) continuously detecting said toasting temperature by said sensor;
(f) moving said cover from said closed position to said opened position when said toasting temperature drops below said preset temperature; and
(g) slidably lifting up said sliding frame to lift up said bread from said heating groove after said cover is moved in said opened position.

10. The method, as recited in claim 9, wherein the step (a) further comprises the steps of:
(a.1) detecting said sliding frame at its lowest position within said heating groove by a first detection device; and
(a.2) detecting said cover at said closed position by a second detection device, wherein said heating element is activated when said sliding frame is moved at its lowest position and said cover is moved in said closed position.

11. The method as recited in claim 9 wherein, in the steps (f) and (g), said sliding frame and said cover are operatively controlled by a main control in a time delaying manner, wherein when said main control circuit detects a toasting time reaching a preset time, said cover is initially actuated to move from said closed position to said opened position from said closed position, and said sliding frame is then time-delayed to be activated to lift up after said cover is moved in said opened position.

12. The method as recited in claim 10 wherein, in the steps (f) and (g), said sliding frame and said cover are operatively controlled by a main control in a time delaying manner, wherein when said main control circuit detects a toasting time reaching a preset time, said cover is initially actuated to move from said closed position to said opened position from said closed position, and said sliding frame is then time-delayed to be activated to lift up after said cover is moved in said opened position.

13. The method, as recited in claim 11, further comprising a safety step of operatively linking a time control circuit to said main control circuit, wherein in case of an abnormal operation of said main control circuit that said toasting time is over said preset time, said time control circuit is activated to maintain said cover in said closed position via said opening mechanism and to maintain said sliding frame at its lowest position.

14. The method, as recited in claim 12, further comprising a safety step of operatively linking a time control circuit to said main control circuit, wherein in case of an abnormal operation of said main control circuit that said toasting time is over said preset time, said time control circuit is activated to maintain said cover in said closed position via said opening mechanism and to maintain said sliding frame at its lowest position.

15. The method, as recited in claim 9, wherein said sensor is located within said heating groove and is selected from the group consisting of a negative temperature coefficient thermistor, a thermocouple temperature sensor, and an infrared temperature sensor.

16. The method, as recited in claim 10, wherein said sensor is located within said heating groove and is selected from the group consisting of a negative temperature coefficient thermistor, a thermocouple temperature sensor, and an infrared temperature sensor.

17. The method, as recited in claim 14, wherein said sensor is located within said heating groove and is selected from the group consisting of a negative temperature coefficient thermistor, a thermocouple temperature sensor, and an infrared temperature sensor.

* * * * *